(12) United States Patent
Rossello et al.

(10) Patent No.: US 7,155,538 B1
(45) Date of Patent: *Dec. 26, 2006

(54) ADAPTIVE FORWARD ERROR CORRECTION FOR OPTIMIZING COMMUNICATIONS OVER PACKET NETWORKS

(75) Inventors: Norbert Rossello, Biot (FR); Fabien Klein, Antibes (FR); Philippe Guasch, Le Bar sur Loup (FR)

(73) Assignee: Mindspeed Technologies, Inc., Newport Beach, CA (US)

( * ) Notice: Subject to any disclaimer, the term of this patent is extended or adjusted under 35 U.S.C. 154(b) by 834 days.

This patent is subject to a terminal disclaimer.

(21) Appl. No.: 10/264,090

(22) Filed: Oct. 2, 2002

Related U.S. Application Data (63) Continuation-in-part of application No. 10/229,438, filed on Aug. 27, 2002.

(51) Int. Cl.
*G06F 15/16* (2006.01)
*H04J 3/16* (2006.01)
*H04J 3/22* (2006.01)
*H03M 13/00* (2006.01)

(52) U.S. Cl. .............. 709/249; 370/465; 379/900; 714/774

(58) Field of Classification Search ........... 709/232, 709/237, 249; 379/93.08, 93.31, 100.17, 379/900; 370/352, 465, 516; 714/751, 774
See application file for complete search history.

(56) References Cited

U.S. PATENT DOCUMENTS

| | | | |
|---|---|---|---|
| 4,047,151 A * | 9/1977 | Rydbeck et al. | 714/774 |
| 5,200,962 A * | 4/1993 | Kao et al. | 714/774 |
| 5,440,405 A * | 8/1995 | Ahmed | 358/435 |
| 5,528,595 A * | 6/1996 | Walsh et al. | 370/402 |
| 5,617,423 A * | 4/1997 | Li et al. | 370/426 |
| 5,699,369 A * | 12/1997 | Guha | 714/774 |
| 5,739,919 A * | 4/1998 | Lee et al. | 358/407 |
| 5,748,333 A * | 5/1998 | Yoshida | 358/445 |
| 5,790,641 A * | 8/1998 | Chan et al. | 379/100.17 |
| 5,999,598 A * | 12/1999 | Henrick et al. | 379/93.07 |
| 6,023,470 A * | 2/2000 | Lee et al. | 370/401 |
| 6,028,679 A * | 2/2000 | Murphy | 358/407 |
| 6,044,485 A * | 3/2000 | Dent et al. | 714/774 |
| 6,256,115 B1 * | 7/2001 | Adler et al. | 358/442 |
| 6,356,545 B1 * | 3/2002 | Vargo et al. | 370/355 |
| 6,400,728 B1 * | 6/2002 | Ott | 370/465 |
| 6,438,105 B1 * | 8/2002 | Qarni et al. | 370/231 |
| 6,504,838 B1 * | 1/2003 | Kwan | 370/352 |

(Continued)

OTHER PUBLICATIONS

Rosenberg, J. "Request for Comments (RFC) 2733: An RTP Payload for Generic Forward Error Correction", published by Network Working Group, Dec. 1999, 26 pages.*

*Primary Examiner*—David Wiley
*Assistant Examiner*—George C. Neurauter, Jr.
(74) *Attorney, Agent, or Firm*—Farjami & Farjami LLP (57) ABSTRACT

An apparatus and method for providing adaptive error correction for a fax and/or modem over packet network session is disclosed. A gateway device configured in accordance with the present invention comprises a controller configured to receive a signal from its local client device and a signal processor coupled to said controller. The signal processor encodes the signal based on a level of error correction selected by the controller. The controller is configured to determine a type of signal communicated by the local client device from, and then select a level of error correction used by the signal processor to encode the signal based on the determined type of signal communicated by the local client device.

17 Claims, 5 Drawing Sheets

U.S. PATENT DOCUMENTS

| | | | |
|---|---|---|---|
| 6,549,587 B1* | 4/2003 | Li | 375/326 |
| 6,714,988 B1* | 3/2004 | Takemoto et al. | 709/249 |
| 6,757,367 B1* | 6/2004 | Nicol | 379/90.01 |
| 6,850,577 B1* | 2/2005 | Li | 375/326 |
| 6,865,220 B1* | 3/2005 | Abrishami | 375/220 |
| 6,980,528 B1* | 12/2005 | LeBlanc et al. | 370/290 |
| 6,985,481 B1* | 1/2006 | Brent et al. | 370/352 |
| 6,987,821 B1* | 1/2006 | Li | 375/345 |
| 2002/0034284 A1* | 3/2002 | Kang | 379/100.06 |
| 2002/0164002 A1* | 11/2002 | Beadle et al. | 379/93.01 |
| 2002/0176401 A1* | 11/2002 | Ryan et al. | 370/352 |
| 2003/0123436 A1* | 7/2003 | Joseph et al. | 370/352 |
| 2003/0164986 A1* | 9/2003 | Boire-Lavigne et al. | 358/400 |
| 2003/0189720 A1* | 10/2003 | Bei et al. | 358/1.15 |
| 2004/0179514 A1* | 9/2004 | Brent et al. | 370/352 |
| 2004/0190499 A1* | 9/2004 | Chen et al. | 370/352 |
| 2005/0200891 A1* | 9/2005 | Cohen | 358/1.15 |

* cited by examiner

ADAPTIVE FORWARD ERROR CORRECTION FOR OPTIMIZING COMMUNICATIONS OVER PACKET NETWORKS

RELATED APPLICATIONS

The present application is a continuation-in-part of U.S. application Ser. No. 10/229,438, filed Aug. 27, 2002, which is hereby fully incorporated by reference in the present application.

BACKGROUND OF THE INVENTION

1. Field of the Invention

The present invention relates generally to communications over packet networks. More particularly, the present invention relates to error correction for modem and fax communications over a packet network, such as the Internet, utilizing the Internet Protocol ("IP").

2. Related Art

In recent years, packet-based networks, such as the Internet, have begun to replace the traditional analog telephone networks for transportation of voice and data. For example, with the emergence of voice over IP ("VoIP"), telephone conversations may now be captured, encoded and transported over the Internet. In a conventional VoIP system, telephone conversations or analog voice may be transported over the local loop or the public switch telephone network ("PSTN") to the central office ("CO"). From the CO, the analog voice is transported to a gateway device at the edge of the packet-based network. The gateway device converts the analog voice or speech to encoded data using a codec (coder/decoder), according to one of various existing protocols, such as G.729, G.711, G.723.1, etc. Next, the encoded data is transmitted over the Internet using the Internet Protocol for reception by a remote gateway device and conversion back to analog voice.

Figure 1:
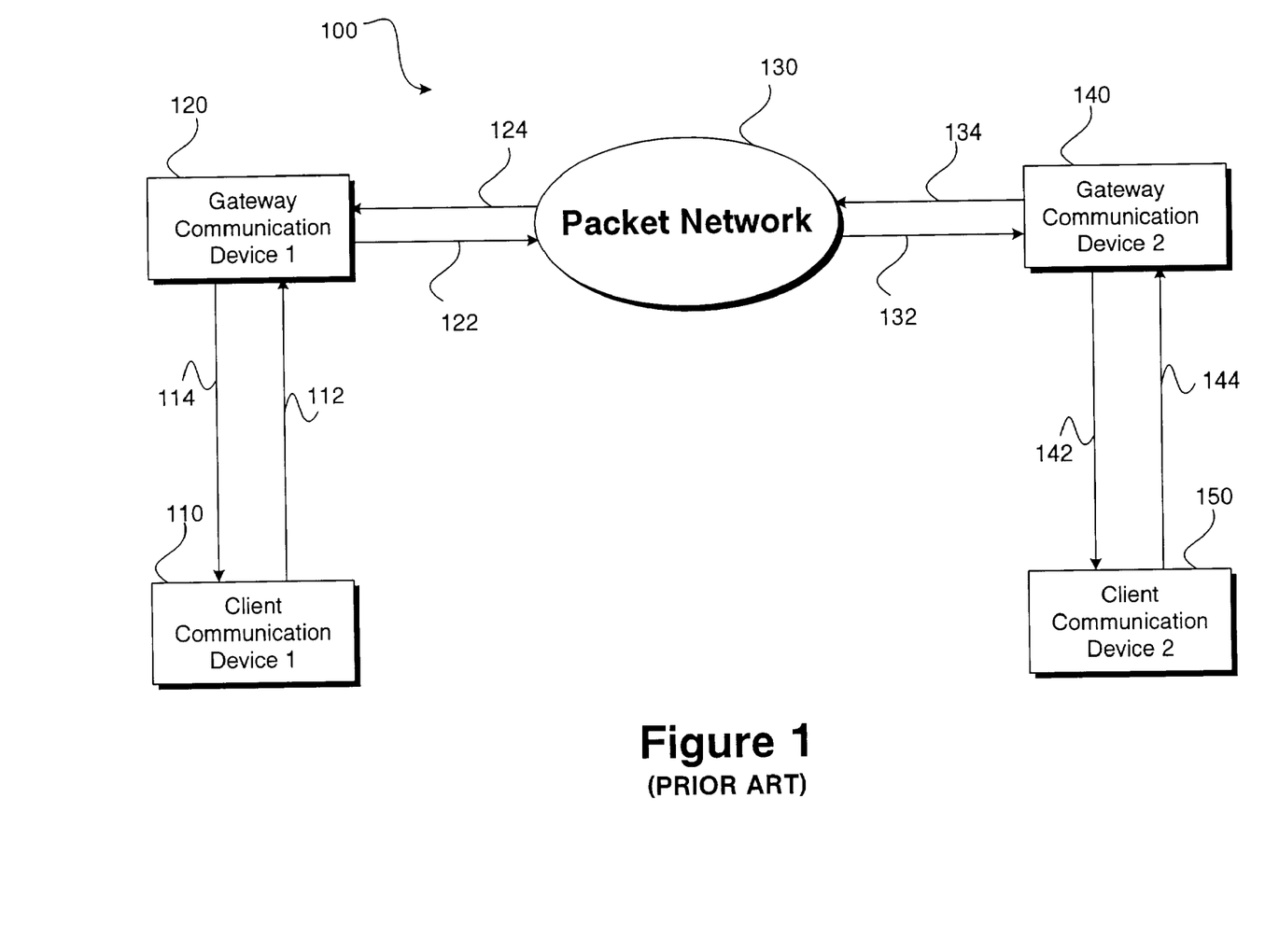
FIG. 1 illustrates a block diagram of a prior art communication model based on a packet network, such as the Internet, utilizing the Internet Protocol.

More recently, focus has been directed toward using the existing packet-based network and gateway devices, which have been designed to support the transportation of analog voice or speech over IP, to further support facsimile ("fax") communication over packet networks (e.g., Fax over Internet Protocol ("FoIP")) and modem communication over packet networks (e.g., Modem over Internet Protocol ("MoIP")). FIG. 1 illustrates a block diagram of a conventional communication model for data communication over a packet-based network, such as the Internet. As shown, communication model 100 includes first client communication device 110 in communication with first gateway communication device 120 over PSTN providing transmit and receive channels 112 and 114. Communication model 100 further includes second client communication device 150 in communication with second gateway communication device 140 over PSTN providing transmit and receive channels 144 and 142. Communication model 100 enables communications between first gateway communication device 120 and second gateway communication device 140 via a packet network 130 utilizing the Internet Protocol. The Internet Protocol implements the network layer (layer 3) of a network protocol, which contains a network address and is used to route a message to a different network or subnetwork. The Internet Protocol further accepts packets from the layer 4 transport protocol, such as Transmission Control Protocol ("TCP") or User Data Protocol ("UDP"), and adds its own header and delivers the data to the layer 2 data link protocol. TCP provides transport functions, which ensures that the total amount of bytes sent is received correctly at the other end. UDP, which is part of the TCP/IP suite, is an alternate transport that does not guarantee delivery. It is widely used for real-time voice and video transmissions where erroneous packets are not retransmitted.

For purposes of FoIP, communication devices 110, 120, 140 and 150 are capable of performing facsimile functions. For MoIP, communication devices 110, 120, 140 and 150 are capable of performing modem functions. Facsimile and modems devices are capable of converting digital pulse to audio frequencies (modulation) and vice versa (demodulation) for transmission of fax or modem data over an analog telephone line using corresponding transmission modulation systems. For example facsimile devices may support a variety fax modulation standards, such as those defined in the ITU (International Telecommunications Union) Group 3 protocols: V.21, V.17, V.27 or V.29, for example. Similarly, modems may support a variety of data modulation standards, such as ITU standards: V.22bis, V.34, V.90 or V.92, etc. Communication devices 110, 120, 140 and 150 may also be cable or DSL modems, which are all digital and technically not modems, but referred to as modems in the industry. Most modems are also capable of supporting various voice and facsimile standards.

Conventionally, the communication process for a FoIP session begins when first client fax (("F1") or first client communication device 110) calls first gateway (("G1") or first gateway communication device 120). As a result, G1 calls second gateway (("G2") or second gateway communication device 140), and G2 in turn calls second client fax (("F2") or second client communication device 150).

Typically, G1 and G2, in their default mode of operation, communicate in voice mode and are configured to use a compressed voice protocol, such as the ITU standard G.723.1. As the calling device, F1 transmits a calling ("CNG") tone (a 1100 hertz (Hz)) half-second tone repeated every 3.5 seconds) when initiating a call to F2. This CNG tone causes G1 and G2 to switch to an uncompressed voice protocol, such as ITU standard G.711, which provides toll quality audio at 64 Kbps using either A-Law or µ-Law pulse code modulation methods. G1 and G2 may also switch to an uncompressed voice protocol upon detection of certain data signals or flags (e.g., CED or V.21 flags). This uncompressed digital format is used in order to allow easy connections to legacy telephone networks. By switching to G.711, the tones generated by F1 may propagate through G1 and G2 in a more intact manner in order to reach F2 at the other side.

One existing method provides for maintaining G1 and G2 in G.711 or "pass through" mode, such that F1 and F2 are able to exchange control commands over packet network 130 and transfer data using G.711 packets using the Internet Protocol. However, such solution suffers from various problems, such as packet losses. Similar problems, including packet losses, also occur during MoIP sessions in pass through mode. Packet losses degrade communication over a packet network, resulting in communication errors between the client devices during FoIP and/or MoIP sessions. Packet losses are particularly problematic over wide-area connections. To overcome such problems, fax connections are terminated locally such that F1 and G1 handshake and make a connection locally and, similarly, F2 and G2 handshake and make a connection locally. After F1 and G1 establish a connection, F1 encodes, modulates and transmits data to G1 on line 112 and G1 receives, demodulates and decodes the data prior to encoding the data for transmission over network 130. Similarly, after F2 and G2 establish a connection, F2 encodes, modulates and transmits data to G2 on line 144 and G1 receives, demodulates and decodes the data prior to encoding the data for transmission over packet network 130. Under such an arrangement, there exists a strong need to provide error correction mode selection and management for data transmission over packet network 130 in order to optimize the bandwidth usage over packet network 130.

SUMMARY OF THE INVENTION

In accordance with the purposes of the present invention as broadly described herein, there is provided an apparatus and method for providing adaptive error correction for a fax and/or modem over packet network session. The packet network generally includes a first gateway device communicatively coupled to a first client device and to a second gateway device, the second gateway device further communicatively coupled to a second client device. The first and second gateway devices are communicatively coupled to each other over a packet network, such as the Internet, for example.

A gateway device configured in accordance with the present invention generally comprises a controller configured to receive a signal from its local client device, a demodulator for demodulating the received signal, and a signal processor coupled to the controller. The signal processor is configured to encode the demodulated signal based on a level of error correction selected by the controller, although in other embodiments, the encoding and decoding may be carried out directly by the controller without the use of the signal processor. In accordance with one embodiment of the present invention, the controller is configured to determine a type of communication signal transmitted by the local client device from the demodulated signal, and then select a level of error correction used by the signal processor to encode the signal based on the determined type of communication signal. After the signal is encoded, the controller transmits the encoded signal to the destination gateway device for decoding, modulating and transmission to the destination client device.

According to another aspect of the present invention, the gateway device is further configured to detect the mode of operation of the local client device. After the mode of operation is determined, the gateway device is configured to select the level of error correction to encode the signal based on the determined type of communication signal transmitted by the client device as well as the mode of operation of the client device.

The present invention is suitable for use with fax communications over packet networks (e.g., FoIP) and modem communications over packet networks (e.g., MoIP).

In accordance with another embodiment of the present invention, a method for providing adaptive error correction comprises: receiving, by a gateway, a signal transmitted by its local client device, demodulating the signal, detecting a type of communication signal from the demodulated signal, selecting a level of error correction to encode the signal based on the detected type of communication signal, and encoding the signal using the selected level of error correction. After encoding the signal, the method further comprises transmitting the encoded signal to a destination gateway.

These and other aspects of the present invention will become apparent with further reference to the drawings and specification, which follow. It is intended that all such additional systems, methods, features and advantages be included within this description, be within the scope of the present invention, and be protected by the accompanying claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present invention may be described herein in terms of functional block components and various processing actions. It should be appreciated that such functional blocks may be realized by any number of hardware components and/or software components configured to perform the specified functions. For example, the present invention may employ various integrated circuit components, e.g., memory elements, digital signal processing elements, logic elements, and the like, which may carry out a variety of functions under the control of one or more microprocessors or other control devices. Further, it should be noted that the present invention may employ any number of techniques for data reception and transmission, signaling, signal processing and conditioning, tone generation and detection and the like. Such general techniques that may be known to those skilled in the art are not described in detail herein.

It should be appreciated that the particular implementations shown and described herein are merely exemplary and are not intended to limit the scope of the present invention in any way. For example, although the present invention is described using a fax over IP network and modem over IP network, it should be noted that the present invention may be implemented in other communication networks and is not limited to fax over IP or modem over IP. Indeed, for the sake of brevity, conventional data transmission, compression/decompression, error correction, encoding, decoding, signaling and signal processing and other functional aspects of the data communication system (and components of the individual operating components of the system) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

Figure 2:
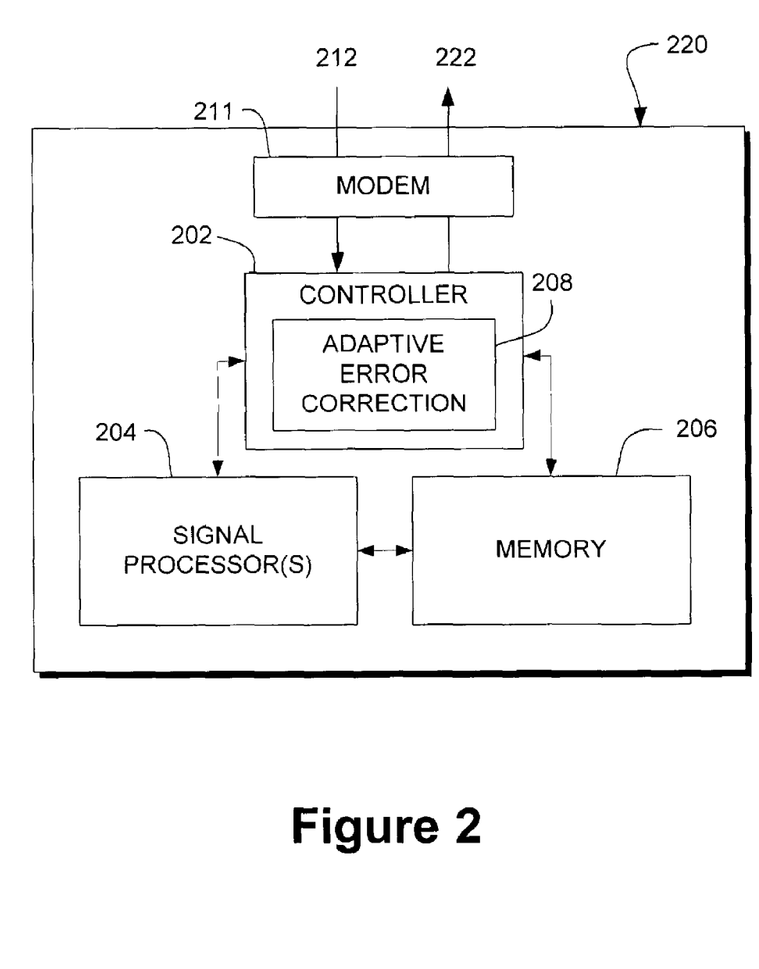
FIG. 2 illustrates a block diagram of a gateway device configured to provide adaptive error correction according to one embodiment of the present invention.

Referring now to FIG. 2, as well as FIG. 1, a block diagram of an illustrative gateway device 220 configured to provide adaptive error correction according to one embodiment of the present invention is shown. Gateway device 220 may replace gateway device 120 and/or gateway device 140 in communication model 100 of FIG. 1 to provide adaptive error correction for signals communicated through packet network 130.

Gateway 220 comprises a controller 208 coupled to a modulator/demodulator unit (modem) 211 for processing signals communicated to gateway 220. Controller 208 receives signals via communication line 212 and transmits signals via communication line 222. Modem 211 is configured to demodulate incoming signals for processing by controller 208 received by gateway 220 from client devices and to module outgoing signals processed by controller 208 for transmission to client devices. Controller 208 is further coupled for communication to a memory 206 and to one or more signal processors 204.

Controller 208 comprises a processor, such as an ARM® microprocessor, for example. In certain embodiments, a plurality of controllers 208 may be used to enhance the performance of gateway 220 or to provide greater channel density. Similarly, a plurality of signal processors 204 may be used to provide increased performance and/or channel density of gateway 220.

Memory 206 stores information accessible by controller 208 and signal processor 204. For example, memory 206 may store one or more encoding schemes, which may be loaded into signal processor 204 for encoding a signal received by controller 202.

Signal processor 204 carries out the operation of converting a signal received from input channel 212 into a digitized and encoded format using an appropriate codec for transmission over packet network 130 to a destination device. For example, as noted above, fax signals are encoded by signal processor 204 using an appropriate communication protocol for transmission over packet network 130.

In accordance with the present invention, an adaptive error correction module 208 is executed by controller 202. Adaptive error correction module 208 generally comprises software, which is executed by controller 202 to control the encoding scheme used by signal processor 204 by signaling signal processor 204 to use one of a plurality of error correction encoding schemes, at least two of which have different levels of error correction. This arrangement allows controller 202 to provide higher level error correction for certain important or critical phases of fax (or modem) operation and lower level error correction for less critical phases of fax (or modem) operation. As described in greater detail below, controller 202 determines the phase of operation of the fax (or modem) by detecting a characteristic of the fax (or modem) signal transmitted by the fax (or modem). This arrangement further allows controller 202 to provide higher level error correction for certain important or critical fax (or modem) signals and lower level error correction for less critical fax (or modem) signals. Controller 202 determines the type of signal by demodulating the signal received by gateway 220 and inspecting the signal for data indicative of certain information or instructions associated with the signal communication as described more fully below.

For purposes of the present invention, references to "fax signal" and "modem signal" will refer to the signals communicated by fax and modem devices, respectively. Referring again to FIG. 1, the fax signals transmitted by a "sending" fax (e.g., client 110) are received by gateway 220 (which replaces gateway 110) and are encoded by gateway 220 using adaptive error correction (e.g., adaptive FEC) as described herein. The encoded fax signal is transmitted by gateway 220 to a destination gateway (e.g., gateway 140) over packet network 130. Upon receipt, the destination gateway (gateway 140) decodes the encoded fax signal, and transmits the decoded fax signal to the destination fax (e.g., client 150). As described in more detail below, gateway 220 determines the mode of operation of its local client device by detecting a characteristic in the signal transmitted by the client device and adjusting the level of error correction dynamically based on the mode of operation. Gateway 220 may also determine the type of signal communicated by the local client device by demodulating the signal and inspecting the signal for data indicative of certain types of communication. In this way, gateway 220 may adjust the level of error correction dynamically based on the type of communication signal.

Also for purpose of the present invention, references to "high," "higher," "medium," "low" and/or "lower" levels of error correction relate to a qualitative and/or quantitative difference in the level of error correction applied to a signal as encoded by signal processor 204. Accordingly, a "higher level" error correction encoding scheme will generally provide more robust error correction than a "lower level" error correction encoding scheme; a "high level" error correction encoding scheme will generally provide more robust error correction than a "medium level" error correction encoding scheme; and a "medium level" error correction encoding scheme will generally provide more robust error correction than a "low level" error correction encoding scheme. Additionally, it is noted that error correction generates a number of packets proportionally to its encoding level (i.e., a higher level error correction generates more packets than a lower level error correction). Accordingly adapting error correction not only optimizes packet loss recovery but also minimizes packet overhead. The different levels of error correction may be employed through a single codec having multiple error correction coders or through multiples codec that have different levels of error correction. As noted above, the present invention may further provide support for greater granularities of error correction levels. For example, the level of error correction selected may be based on the mode of operation of the client devices and/or the type of signal communicated by the client devices. Certain types of signals within a given mode of operation may be designated with a higher level of error correction while other types of signals within the given mode of operation may be designated with a lower level of error correction. This arrangement provides the advantage of optimizing the use of bandwidth based on the type of signal being transmitted during and/or the mode of operation.

Figure 3:
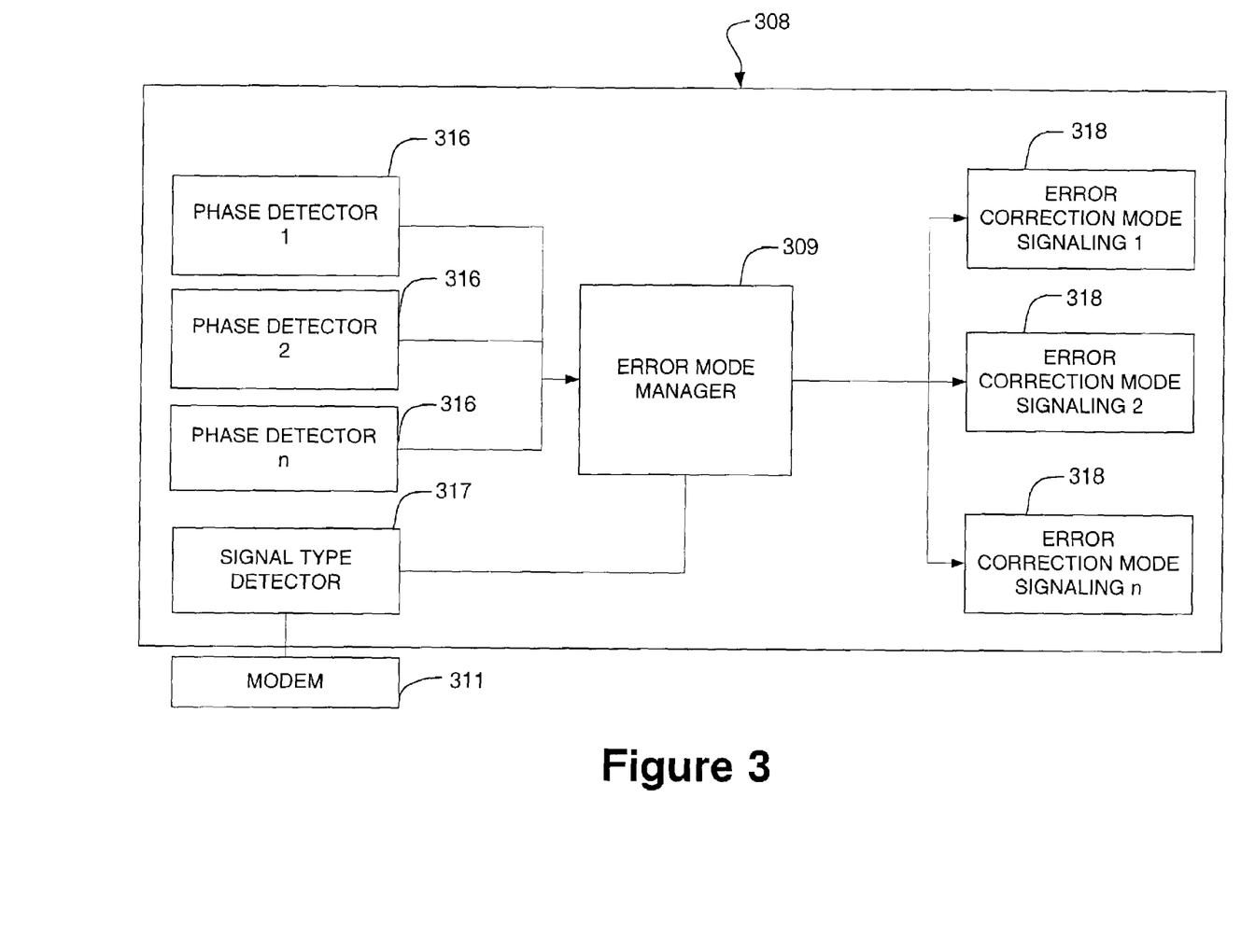
FIG. 3 illustrates a block diagram of an adaptive error correction module according to one embodiment of the present invention.

Referring next to FIG. 3, as well as FIG. 2, a block diagram of an adaptive error correction module 308 according to one embodiment of the present invention and suitable for execution by controller 202 is shown. Adaptive error correction module 308 comprises an error mode manager 309 communicably coupled to one or more phase detectors 316 and a signal type detector 317. As illustrated in FIG. 3, a plurality of phase detectors 316 (1 through n) are shown, although the present invention is equally suitable for use with a single phase detector 316 as described below in conjunction with the illustrative embodiment of FIG. 4.

Error mode manager 309 is further communicably coupled to a plurality of error correction mode signaling modules 318 (1 through n) which provide a signal to processor 204 indicating a level of error correction for encoding a signal. In general, the present invention provides at least two (2) different error correction encoding schemes (i.e., having different levels of error correction) for encoding signals, although any plurality of error correction encoding schemes are suitable for use with the present invention.

Indeed, a separate level of error correction may be assigned to each of the various modes of operation and/or type of communication signal of a fax or modem device if desired.

Phase detectors 316 are configured to detect a mode of operation of the client device (e.g., fax or modem) communicably coupled to gateway 220. For example, during a FoIP session, the fax devices have several phases of operation, including a call-setup phase, various control phases, a page transfer phase and a listening (or silent) phase, among others. During a MoIP session, the modem devices also have various phases of operation including a call-setup or negotiation phase, a rate renegotiation phase, a retraining phase, a data transmission phase and a data receive phase, among others.

Certain phases of operation during a FoIP or MoIP session are more critical than others. Thus, during a FoIP session, the call-setup phase and control phases are more critical than either the page transfer phase or the listening phase. Likewise, during a MoIP session, the call-setup or negotiation phase, rate renegotiation phase and retraining phase are more critical than the data transmission phase or the data receive phase. In accordance with the present invention, the controller 202 selects a higher level of error correction to encode signals associated with more critical phases, and selects a lower level of error correction to encode signals associated with less critical phases based on the detected mode of operation. According to some embodiments of the present invention, three or more levels of error correction may be defined for the phases of operation of the client devices in accordance with the granularity of error correction levels for gateway 220.

As pointed out above, the mode of operation of the client device is generally determined by detecting a characteristic in the signal transmitted by the client device. In accordance with one embodiment of the present invention, phase detectors 316 are configured as "tone detectors" to detect the transmission of certain tones, audio frequencies, or energy in the signal transmitted by client device. For example, a V.21 detector may be used to detect the transmission of a V.21 signal. Since the fax (or modem) device uses certain protocols during certain modes of operation (e.g., V.21 for call-setup and control phases; V.17, V.27 or V.29 for page transmission), error mode manager 309 is able to determine the mode of operation based on the signal detected from the client device.

Various ways of detecting these particular signals may be used in conjunction with the present invention. For example, a V.21 detector 316 may be configured to detect a V.21 signal by monitoring V.21 detector circuitry operating in gateway 220. In this way, when the V.21 detector circuitry is activated, V.21 detector 316 determines that the signal received by gateway 220 from the client device is a V.21 signal.

If V.21 detector 316 detects the activation of V.21 detector circuitry, a signal is transmitted to error mode manager 309 to indicate the transmission of a V.21 signal. Since V.21 signals are transmitted during "critical phases" wherein important control commands are transmitted (i.e., during call-setup phase or control phases in FoIP), error mode manager 309 signals the appropriate "high level" error correction mode signaling module 318. "High level" error correction mode signaling module 318 then signals signal processor 204 to encode the signal using an appropriate "high level" error correction encoding scheme.

In some embodiments, a silence detector 316 may also be implemented to detect whether client device is operating in a "listening" or "receiving" mode. When silence (i.e., a lack of a Fax signal) is detected by silence detector 316, a signal is transmitted to error mode manager 309 to indicate the activation of "listening" or "receiving" mode. Since "listening" or "receiving" mode is considered the least critical phase in FoIP, error mode manager 309 signals the appropriate "low level" error correction mode signaling module 318. "Low level" error correction mode signaling module 318 then signals signal processor 204 to encode the fax signal using an appropriate "low" error correction encoding scheme.

On the other hand, if a data detector 316 detects the transmission of a Fax data signal that is not a V.21 signal (i.e. where the V.21 detector 316 does not detect activation of V.21 circuitry and where silence detector 316 does not detect silence), a signal is transmitted to error mode manager 309 to indicate the transmission of a data signal. Since data transmit phase (e.g., during page send for FoIP) is less critical, error mode manager 309 signals the appropriate "medium level" error correction mode signaling module 318. Loss of page data is generally considered less critical than loss of control commands, since page data can normally be recovered and/or retransmitted, whereas loss of control may result in both the corruption of page data and the corruption of the FoIP session. "Medium level" error correction mode signaling module 318 then signals signal processor 204 to encode the fax signal using an appropriate "medium" error correction encoding scheme. In other embodiments, a "data" detector may be implemented to directly determine a data transmission mode of operation, rather than indirectly (e.g., by detecting a lack of a V.21 signal and a lack of silence). For example, a data detector could validate a constant flat data energy in a given bandwidth without signal demodulation. Upon detection of such energy, data transmission mode could be directly detected by the data detector.

In accordance with another preferred embodiment of the present invention, phase detectors 316 may be configured as "data detectors" to detect the mode of operation of the client device. In this embodiment, gateway 220 further comprises a demodulator 311 for demodulating the signal received by gateway 220 from the client device. The demodulated data is then inspected by phase detectors 316 to ascertain the mode of operation of the client device. Various ways for ascertaining the mode of operation of the client device by inspecting the signal may be used in conjunction with the present invention. For example, the demodulated signal may be inspected for certain data indicative of commands or instructions (or lack thereof) associated with certain modes of operations (e.g., page transfer signaling or end of page signaling) using techniques known in the art.

After the mode of operation is determined by phase detectors 316, a signal is communicated to error mode manager 309 for enabling one of the error correction mode signaling modules 318 corresponding to the level of error correction associated with the determined mode of operation as described above. The enabled error correction mode signaling module 318 then signals signal processor 240 to encode the signal using a corresponding the level of error correction associated with the determined mode of operation. It is further noted that other means for determining the mode of operation of the client device by adaptive error correction module 208 are suitable for use with the present invention, and that phase detectors 316 employing tone detection or data detection are only illustrative examples.

In accordance with another aspect of the present invention, the level of error correction selected by error mode manager 309 may be based on the type of communication signal transmitted by the client device, either in conjunction with the determined mode of operation of the client device or independent of the determined mode of operation of the client device. Thus, adaptive error correction module 308 may define an error correction level based on the determined mode of operation of the client device, the determined signal type communicated by the client device, or both. For example, during certain modes of operation, various types of communication signals may be transmitted by the client device, such as communication signals embodying HDLC frames and flags. As is known in the art, each HDLC frame is encoded within a plurality of trailing and ending HDLC flags (7Eh). Typically, in a facsimile mode of operation, HDLC frames are preceded by about one (1) second of HDLC flags. By demodulating the communication signals, the gateway device will be able to distinguish between the HDLC flags and HDLC frames and, thus, a higher level of error correction may be selected to encode HDLC frames while a lower level of error correction may be selected for encoding HDLC flags. As another example, certain types of HDLC frames in the facsimile mode (e.g., "end of line" frames) are considered more critical than other HDLC frames and therefore may be encoded using a high level of error correction. As can be realized by the preceding examples, the level of error correction selected for encoding a given signal may be based on the each frame on a frame-by-frame basis. In other words, the selection of the level of error correction for encoding a given signal may be based on the type of signal transmitted by the client device and/or the mode of operation of the client device As another example, data modems use various error correction protocols based on HDLC, such as MNP4 and LAPM. While M1 and G1 are connected in error correction mode, M1 continuously transmits HDLC flags and HDLC frames are inserted in this continuing stream of flags for transmitting data from M1 to G1. By demodulating communication signals embodying HDLC frame and flags, G1 will be able to distinguish between the continuing stream of flags and HDLC frames inserted therebetween and, thus, G1 will apply a higher level of error correction to encode HDLC frames and a lower level of error correction to encode HDLC flags. Accordingly, the packet network bandwidth is preserved by using a lower level of error correction for non-critical HDLC flags.

Signal type detector 317 coupled to demodulator 311 is configured to detect the type of communication signal transmitted by the client device (e.g., fax or modem) communicably coupled to gateway 220. A demodulator 311 demodulates the signal received by gateway 220 from the client device. The demodulated data is then inspected by signal type detector 317 to ascertain the type of signal transmitted by the client device. Various ways for ascertaining the type of signal transmitted by the client device may be used in conjunction with the present invention. For example, the demodulated signal may be inspected for certain data indicative of commands, instructions, etc. (or lack thereof) associated with certain type of signals (e.g., page transfer signaling or end of page signaling) using techniques known in the art.

After the type of signal is determined by signal type detectors 311, mode manager 309 enables one of the error correction mode signaling modules 318 corresponding to the level of error correction associated with the determined type of signal. The enabled error correction mode signaling module 318 then requests signal processor 240 to encode the signal using a corresponding the level of error correction associated with the determined type of signal.

While the above discussion has been primarily directed to an embodiment employed in a FoIP session, the operations and functions of adaptive error correction module 208 is equally adaptable for modem communications during MoIP sessions to provide adaptive error correction as would be readily apparent to one skilled in the art having the benefit of this disclosure. For example, a V.8 or V.8bis detector 316 (such as the V.21 detector described above) may be used to detect a call set-up mode of operation, in which case a higher level of error correction encoding would be implemented to encode signals. Otherwise, if V.8 or V.8bis detector 316 fails to detect the call set-up mode, a lower level of error correction encoding would be implemented to encode signals. To determine the type of signal communicated by the modem device, signal type detector 317 inspects the demodulated data for certain data indicative of modem commands, instructions, etc. (or lack thereof) associated with certain type of signals (e.g., error correction negotiation phase in data mode, request for speed change, request for retrain, etc.) using techniques known in the art.

Thus, during operation of gateway 220, the controller 202 is capable of adaptively or dynamically selecting a suitable level of error correction for encoding a signal transmitted by the client device in accordance with the mode of operation as determined from the signal and/or the type of communication signal determined from the demodulated signal. Various illustrative embodiments for carrying out adaptive error correction in accordance with the present invention will now be described with reference to FIGS. 4 and 5.

Figure 4:
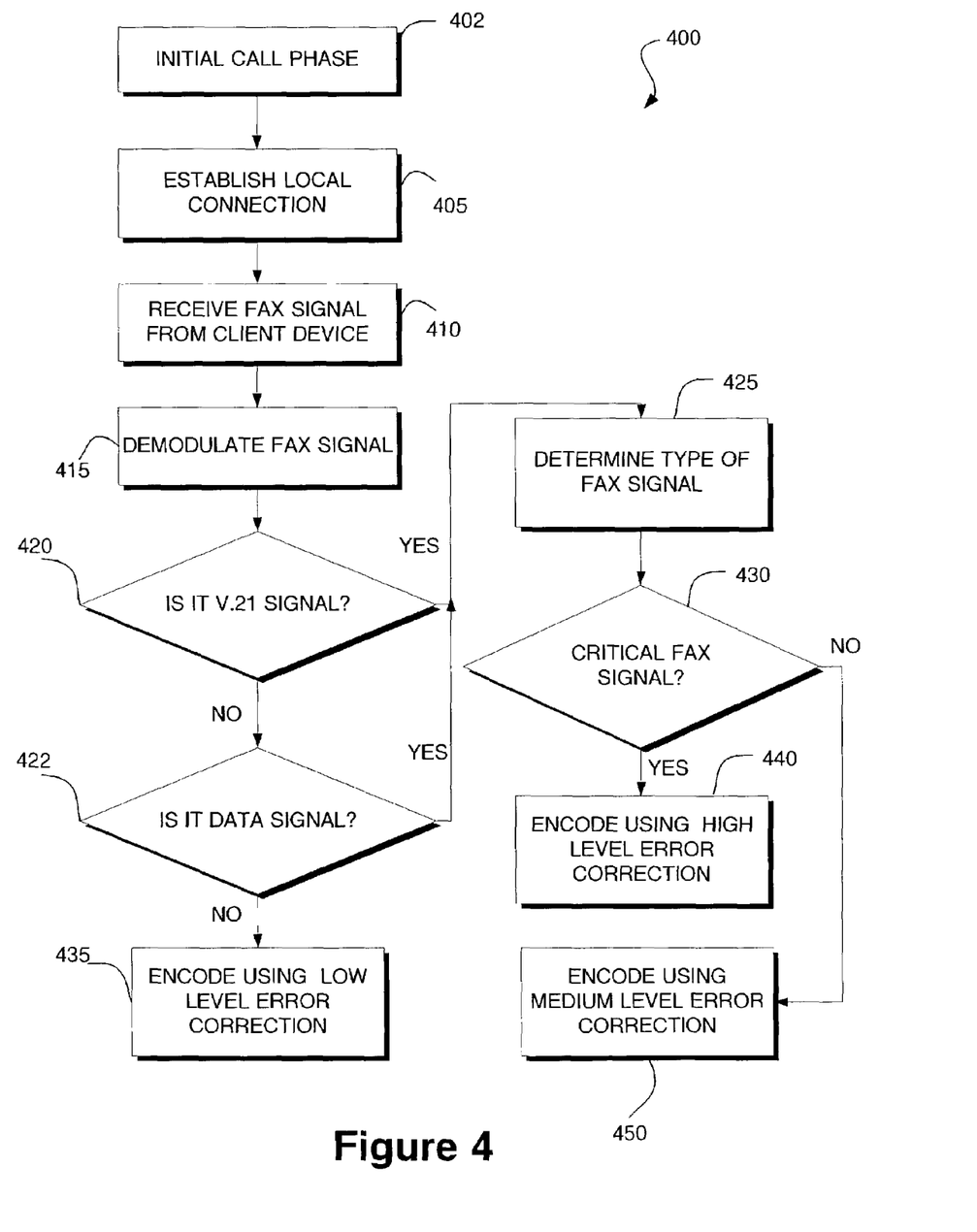
FIG. 4 illustrates a logical flow diagram for carrying out adaptive error correction according to one embodiment of the present invention.

Referring now to FIG. 4, as well as FIGS. 1 through 3, a logical flow diagram 400 for carrying out adaptive error correction for a FoIP session according to one embodiment of the present invention is generally shown wherein the level of error correction selected to encode a signal is based on the type of signal detected as well as the mode of operation detected. According to this illustrative embodiment, gateway 220 includes at least three different error correction encoding levels for encoding signals: a "high" level, a "medium" level and a "low" level. The "high" level is selected when critical fax signals are communicated (e.g., critical HDLC frames, critical data frame including the End of Line marker); the "medium" level is selected when less critical signals are communicated (e.g., non-critical HDLC flags, regular data frames including body page); the "low" level is selected during the least critical phase of fax operation (e.g., silent or page receive mode).

Method 400 begins during an initial call phase 402, when first client communication device or first fax device (F1) 110 calls first gateway communication device or first gateway modem (G1) 120 over a communication line, such as a telephone line. In response, G1 120 calls or contacts second gateway communication device or second gateway modem (G2) 140 over packet network 130. As a result, G2 140 calls second client communication device or second fax device (F2) 150 over a communication line, such as a telephone line.

Typically, as their default mode of operation, G1 120 and G2 140 communicate in voice mode and use a compressed voice protocol, such as a speech protocol based on the ITU standard G.723.1. As the calling device, F1 110 transmits a calling ("CNG") tone (a 1100 hertz (Hz)) half-second tone repeated every 3.5 seconds) when initiating a call to F2 150. This CNG tone causes G1 120 and G2 140 to switch to facsimile mode and, in block 405, local connections are established between G1 120 and F1 110 on the one hand, and G2 140 and F2 150 on the other. G1 120 and G2 140 may also switch to facsimile mode upon detection of certain data signals or flags (e.g., CED or V.21 flags).

At block 410, a fax signal is received by G1 120 from F1 110. The fax signal may be communicated anytime during the FoIP session, such as during the call-setup phase, the control phase, the page-transmit phase, or other fax communication phase. As such, F1 110 may be either the calling or initiating client device or the answering or destination client device. In either case, G1 120 provides adaptive error correction for signals transmitted by F1 110 for transmission over packet network 130.

Next at block 415, the fax signal is demodulated by G1 120 using well-known demodulation techniques, to generate a demodulated fax signal. Next, in block 420, G1 120 determines whether the demodulated fax is a V.21 signal, if so, a signal is communicated to error mode manager 309 indicating the detection of a V.21 signal. Since fax devices transmit V.21 signals during important or critical phases of operation wherein important control commands are transmitted (e.g., call-setup, page control, page acknowledgement, etc.), method 400 continues to blocks 425 and 430 where the type of fax signal is determined in order to select the level of error correction.

On the other hand, if G1 120 determines that the demodulated fax signal is not a V.21 signal, G1 120 determines whether the demodulated fax signal is a data signal at block 422. If so, method 400 continues to block 425. Otherwise, a signal is communicated to error mode manager 309 indicating the non-detection of a V.21 signal or data signal. Since the current fax signal is neither V.21 nor data, the current mode of operation is considered non-critical. Accordingly, error mode manager 309 signals "lower level" error correction encoding mode signaling module 318 to instruct signal processor 204 to encode the fax signal with a corresponding lower level error correction encoding scheme. Method 400 then continues to block 435 where signal processor 204 encodes the fax signal with the specified lower level error correction encoding scheme.

At block 425, the demodulated fax signal is inspected by signal type detector 317 to ascertain the type of fax signal. Next, at block 430, G1 120 determines whether the type of fax signal indicates a critical fax signal. As noted above, certain fax signals may be considered more critical than others. For example, HDLC flags (e.g., trailing flags for HDLC frames) are less critical than the HDLC frame and, yet, certain HDLC frames are more critical than others (e.g., end of line frames). If signal type detector 317 determines that the fax signal is a critical fax signal, signal type detector 317 notifies error mode manager 309 that a critical fax signal has been detected. As a result, error mode manager 309 signals "high level" error correction encoding mode signaling module 318 to instruct signal processor 204 to encode the fax signal with a corresponding high level error correction encoding scheme. Method 400 then continues to block 440 where signal processor 204 encodes the fax signal with the specified high level error correction encoding scheme.

If, on the other hand, signal type detector 317 determines that the fax signal is a not critical fax signal, signal type detector 317 notifies error mode manager 309 that a critical fax signal has not been detected. As a result, error mode manager 309 signals "medium level" error correction encoding mode signaling module 318 to instruct signal processor 204 to encode the fax signal with a corresponding medium level error correction encoding scheme. Method 400 then continues to block 450 where signal processor 204 encodes the fax signal with the specified medium level error correction encoding scheme.

The encoded fax signal (from block 430 or 435) is then transmitted by G1 120 to G2 140 over packet network 130 for further processing. The above process is repeated as G1 120 processes fax signals from F1 110, thereby providing adaptive error correction based on the type of fax signal communicated by F1 110 as well as the mode of operation of F1 110 during the FoIP session.

Figure 5:
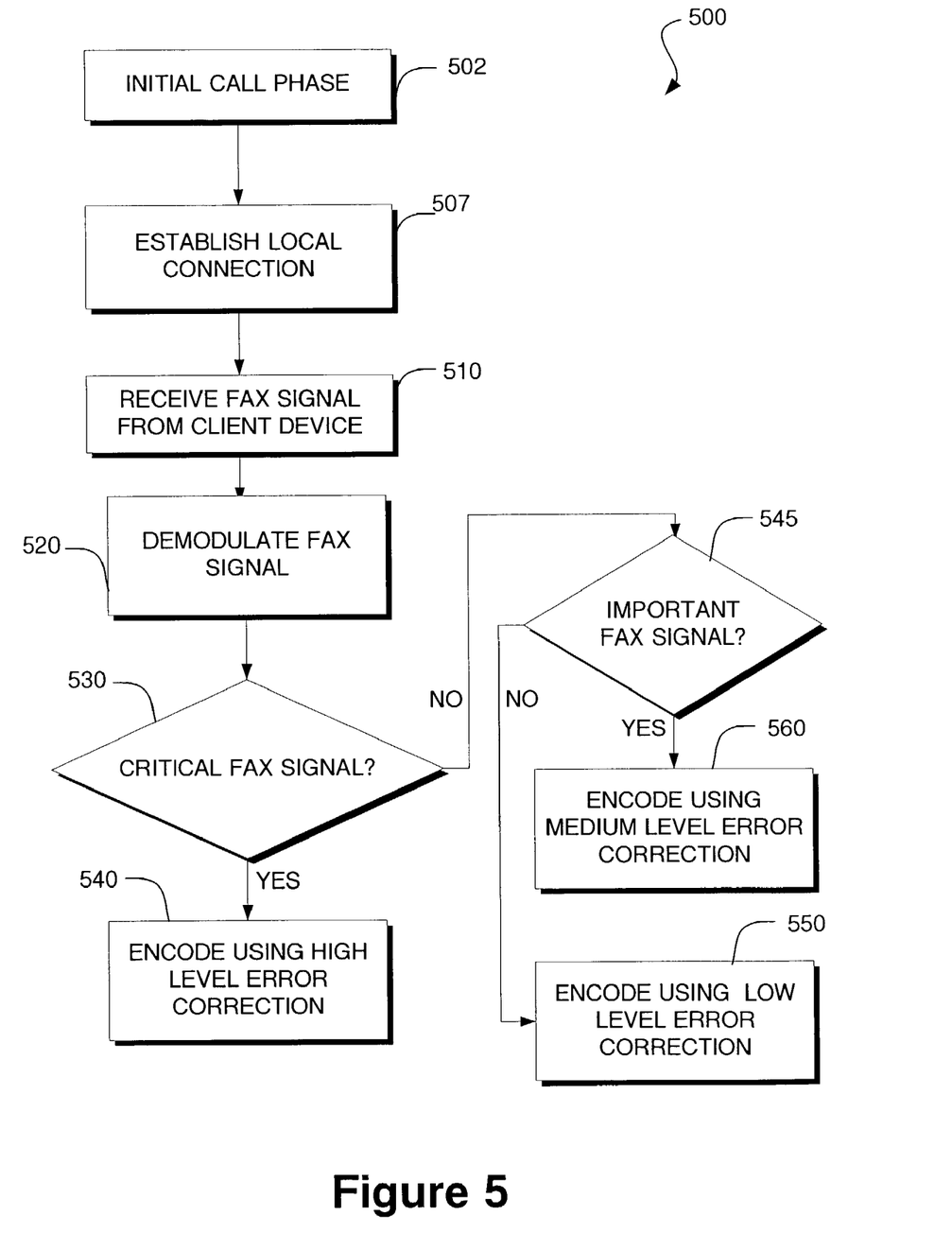
FIG. 5 illustrates a logical flow diagram for carrying out adaptive error correction according to another embodiment of the present invention.

Referring now to FIG. 5, as well as FIGS. 1 through 3, a logical flow diagram 500 for carrying out adaptive error correction for a FoIP session according to another embodiment of the present invention is shown wherein the level of error correction selected to encode a signal is based on the type of signal detected independent of the mode of operation of the client device. G1 120 includes at least three different error correction encoding levels for encoding signals: a "high" level, a "medium" level and a "low" level. The "high" level is selected when a critical fax signal is transmitted; the "medium" level is selected when a non-critical, but important, fax signal is transmitted; the "low" level is selected when the least critical fax signal is transmitted or when the fax device is silent or listening.

Method 500 begins during an initial call phase 502, when first client communication device or first fax device (F1) 110 calls first gateway communication device or first gateway modem (G1) 120 over a communication line, such as a telephone line. In response, G1 120 calls or contacts second gateway communication device or second gateway modem (G2) 140 over packet network 130. As a result, G2 140 calls second client communication device or second fax device (F2) 150 over a communication line, such as a telephone line.

Typically, as their default mode of operation, G1 120 and G2 140 communicate in voice mode and use a compressed voice protocol, such as a speech protocol based on the ITU standard G.723.1. As the calling device, F1 110 transmits a calling ("CNG") tone (a 1100 hertz (Hz)) half-second tone repeated every 3.5 seconds) when initiating a call to F2 150. This CNG tone causes G1 120 and G2 140 to switch to facsimile mode and, in block 507, local connections are established between G1 120 and F1 110 on the one hand, and G2 140 and F2 150 on the other.

At block 510, a fax signal is received by G1 120 from F1 110. The fax signal may be communicated anytime during the FoIP session, such as during the call-setup phase, the control phase, the page-transmit phase, or other fax communication phase. As such, F1 110 may be either the calling or initiating client device or the answering or destination client device. In either case, G1 120 provides adaptive error correction for signals transmitted by F1 110 for transmission over packet network 130.

At block 520, the fax signal is demodulated by G1 120. Next at decision block 530, the fax signal is inspected by signal type detector 317 to ascertain whether the fax signal is a critical fax signal. As noted above, certain HDLC frames may be considered more critical than others. For example, HDLC flags (e.g., trailing flags for HDLC frames) are less critical than the HDLC frames and certain HDLC frames are more critical than others (e.g., end of page or line frames). If signal type detector 317 determines that the fax signal is a critical fax signal, signal type detector 317 notifies error mode manager 309 that a critical fax signal has been detected. As a result, error mode manager 309 signals "high level" error correction encoding mode signaling module 318 to instruct signal processor 204 to encode the fax signal with a corresponding high level error correction encoding scheme. Method 500 then continues to block 540 where signal processor 204 encodes the fax signal with the specified high level error correction encoding scheme.

If, on the other hand, signal type detector 317 determines that the fax signal is a not critical fax signal, method 500 continues to decision block 545 wherein signal type detector 317 ascertains whether the fax signal is a non-critical, but important fax signal (e.g., HDLC flags or fax data transmitted during fax transmission). If signal type detector 317 determines that the fax signal is a non-critical, but important fax signal, signal type detector 317 notifies error mode manager 309 that an important fax signal has been detected. As a result, error mode manager 309 signals "medium level" error correction encoding mode signaling module 318 to instruct signal processor 204 to encode the fax signal with a corresponding medium level error correction encoding scheme. Method 500 then continues to block 560 where signal processor 204 encodes the fax signal with the specified medium level error correction encoding scheme.

If, however, the signal type detector 317 determines that the fax signal is a non-critical non-important fax signal, signal type detector 317 notifies error mode manager 309 that a neither a critical nor an important fax signal has been detected. As a result, error mode manager 309 signals "low level" error correction encoding mode signaling module 318 to instruct signal processor 204 to encode the fax signal with a corresponding low level error correction encoding scheme. Method 500 then continues to block 550 where signal processor 204 encodes the fax signal with the specified low level error correction encoding scheme.

The encoded fax signal (from block 530, 550 or 560) is then transmitted by G1 120 to G2 140 over packet network 130 for further processing. The above process is repeated as G1 120 processes fax signals from F1 110, thereby providing adaptive error correction based on the type of signal communicated by F1 100 independent of the mode of operation of F1 110 during the FoIP session.

The methods and systems presented above may reside in software, hardware, or firmware on the device, which can be implemented on a microprocessor, digital signal processor, application specific IC, or field programmable gate array ("FPGA"), or any combination thereof, without departing from the spirit of the invention. Furthermore, the present invention may be embodied in other specific forms without departing from its spirit or essential characteristics. The described embodiments are to be considered in all respects only as illustrative and not restrictive.

What is claimed is:

1. A gateway device capable of being communicably coupled to a first client device over a communication line and to a second gateway device over a packet network, said first gateway device comprising:
a controller configured to determine whether said first client device operates in a fax mode or a data modem mode, and wherein said controller is further configured to receive signals from said first client device after determining said mode of said first client device;
a demodulator coupled to said controller, said demodulator configured to demodulate said signals to generate demodulated signals; and
a signal processor coupled to said controller;
said controller configured to determine a type of each of said signals by inspecting each of said demodulated signals, said controller further configured to adaptively select one of a plurality of levels of error correction used by said signal processor for encoding each of said signals based on said type of each of said demodulated signals to generate encoded signals.

2. The gateway device of claim 1, wherein said controller is further configured to transmit said encoded signals to said second gateway device over said packet network.

3. The gateway device of claim 1, further comprising at least one signal type detector communicably coupled to said controller, said signal type detector configured to inspect said demodulated signals for data indicative of a signal type.

4. The gateway device of claim 1, wherein said controller is further configured to select a higher level of said plurality of levels of error correction for encoding said demodulated signals if said controller detects a critical signal in said demodulated signals, said controller configured to select a lower level of said plurality of levels of error correction for encoding said demodulated signals if said controller fails to detect a critical signal in said demodulated signals, wherein said higher level has less packet loss than said lower level.

5. The gateway device of claim 4, wherein said critical signal includes one of a call-setup signal, a negotiation signal or a control signal.

6. The gateway device of claim 1, further comprising a low level of error correction, a medium level of error correction, and a high level of error correction, wherein said high level has less packet loss than said medium level and said medium level has less packet loss than said low level, wherein said controller is further configured to:
select said high level of error correction to encode said demodulated signal if said controller detects a critical signal in said demodulated signal,
select said low level of error correction to encode said demodulated signal if said controller detects a lack of a fax signal in said demodulated signal, and
select said medium level of error correction to encode said demodulated signal if said controller fails to detect a critical signal in said demodulated signal.

7. The gateway device of claim 1, wherein said first client device comprises a facsimile device, said signals comprising facsimile modulated signals.

8. The gateway device of claim 1, wherein said first client device comprises a modem device, said signals comprising modem modulated signals.

9. The gateway device of claim 4, wherein said controller is further configured to select said lower level of said plurality of levels of error correction for encoding said demodulated signals if said controller detects a silence signal in said demodulated signals.

10. A method for providing adaptive error correction in a first gateway communicably coupled to a second gateway over a packet network, said first gateway further communicably coupled to a first client device, said method comprising:
determining whether said first client device operates in a fax mode or a data modem mode;
receiving signals transmitted by said first client device to said first gateway after determining said mode of said first client device;
demodulating said signals to generate demodulated signals;
detecting a type of each of said signals by inspecting each of said demodulated signals;
adaptively selecting one of a plurality of levels of error correction to encode said each of said signals based on said type of each of said demodulated signals; and
encoding said demodulated signal using said level of error correction to generate encoded signals.

11. The method of claim 10, further comprising transmitting said encoded signals from said first gateway to said second gateway.

12. The method of claim 10, wherein said selecting selects a higher level of said plurality of levels of error correction for encoding said demodulated signals if said detecting detects a critical signal in said demodulated signals, and wherein said selecting selects a lower level of said plurality of levels of error correction for encoding said demodulated signals if said detecting fails to detect a critical signal in said demodulated signals, wherein said higher level has less packet loss than said lower level.

13. The method of claim 12, wherein said critical signal includes one of a call-setup signal, a negotiation signal or a control signal.

14. The method of claim 10, wherein said selecting comprising:
   selecting a high level of error correction to encode said demodulated signal if said detecting detects a critical signal in said demodulated signal,
   selecting a low level of error correction to encode said demodulated signal if said detecting detects a lack of a fax signal in said demodulated signal, and
   selecting a medium level of error correction to encode said demodulated signal if said detecting fails to detect a critical signal in said demodulated signal;
   wherein said high level has less packet loss than said medium level and said medium level has less packet loss than said low level.

15. The method of claim 10, wherein said first client device comprises a facsimile device, said signals comprising facsimile modulated signals.

16. The method of claim 10, wherein said first client device comprises a modem device, said signals comprising modem modulated signals.

17. The method of claim 12, wherein said selecting selects said lower level of said plurality of levels of error correction for encoding said demodulated signals if said detecting detects a silence signal in said demodulated signals.

* * * * *